(12) United States Patent
Shen et al.

(10) Patent No.: US 8,429,146 B2
(45) Date of Patent: *Apr. 23, 2013

(54) PREDICTING FUTURE QUERIES FROM LOG DATA

(75) Inventors: Dou Shen, Redmond, WA (US); Ying Li, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/334,953

(22) Filed: Dec. 22, 2011

(65) Prior Publication Data

US 2012/0095985 A1  Apr. 19, 2012

Related U.S. Application Data

(63) Continuation of application No. 13/157,889, filed on Jun. 10, 2011, now Pat. No. 8,112,409, which is a continuation of application No. 12/204,472, filed on Sep. 4, 2008, now Pat. No. 7,979,415.

(51) Int. Cl.
*G06F 17/30* (2006.01)
(52) U.S. Cl.
USPC .......................................... 707/706; 707/786
(58) Field of Classification Search .................. 707/706, 707/786
See application file for complete search history.

(56) References Cited

U.S. PATENT DOCUMENTS

| | | | |
|---|---|---|---|
| 6,772,374 B2 | 8/2004 | Forman et al. | |
| 7,031,958 B2 | 4/2006 | Santosuosso | |
| 7,249,128 B2 | 7/2007 | Chess | |
| 7,647,312 B2 | 1/2010 | Dai | |
| 7,979,415 B2 | 7/2011 | Shen et al. | |
| 8,112,409 B2 * | 2/2012 | Shen et al. | 707/706 |
| 2005/0125390 A1 | 6/2005 | Hurst-Hiller | |
| 2006/0064411 A1 | 3/2006 | Gross | |
| 2007/0136457 A1 | 6/2007 | Dai | |
| 2007/0208730 A1 | 9/2007 | Agichtein | |
| 2007/0226178 A1 | 9/2007 | Ewen | |

OTHER PUBLICATIONS

Notice of allowance in U.S. Appl. No. 12/204,472 mailed Apr. 21, 2011.
Ronny Lempel and Shlomo Moran, ""Predictive Caching and Prefetching of Query Results in Search Engines"" WWW 2003 Proceedings of the 12th International Conference on World Wide Web, ACM, pp. 1-1 0.
Benjamin Piwowarski and Hugo Zaragoza, ""Predictive User Click Models Based on Click-Through History"", Proceedings of the sixteenth ACM Conference on information and Knowledge Management 2007, pp. 1-8.

(Continued)

*Primary Examiner* — Cheryl Lewis
(74) *Attorney, Agent, or Firm* — Shook, Hardy & Bacon LLP

(57) ABSTRACT

A system, media, and method for selecting future queries are provided. The selected future queries are used to transmit appropriate online advertising to a user that issues queries to a search engine. The search engine is coupled to a prediction component that predicts what subject the user is going to be interested in and when the user will be interested in the subject. The prediction component returns a future query using statistical language models representing a query history of the user and aggregate query histories for a community of users.

20 Claims, 5 Drawing Sheets

OTHER PUBLICATIONS

Honghua (Kathy) Dai, et al., ""Detecting Online Commercial Intention (OCI),"" WWW 2006, May 23-26, 2006, Ed~nburghS, cotland, 9 pages, http://www2006.org/programme/files/pdf/6OI6.pdf.

Xi, et al., "IsRprojQueryLog," Sep. 10, 2002, 4 pages, http://collab.dlib.vt.edu/runwiki/wiki.pl?IsRprojQueryLog.

Mikhail Bilenko, et al., ""Talking the Talk vs. Walking the Walk: Salience of Information Needs in Querying vs, Browsing,"" SIGIR'08, Jul. 20-24, 2008 Singapore, 2 pages, http://research.microsofi.com/-mbilenko/papers/08-sigirposter.Pdf.

Wens1 Xi, et al., "Query Log Analysis," 5 pages,http://www.ir.iit.edu/-abdur/publications/QueryResearch.pdf.

Notice of Allowance in U.S. Appl. No. 13/157,889, mailed Nov. 23, 2011.

* cited by examiner

PREDICTING FUTURE QUERIES FROM LOG DATA

PRIORITY

This application claims priority and is a continuation of U.S. application Ser. No. 13/157,889, U.S. Pat. No. 8,112,409, filed Jun. 10, 2011, which is a continuation of U.S. application Ser. No. 12/204,472, filed Sep. 4, 2008, now U.S. Pat. No. 7, 979,415; and each continuation is incorporated herein by reference.

BACKGROUND

Conventionally, short-term intent detection applications are used to predict a user's subsequent query based on previous queries. The short-term intent detection applications are executed by search engines to provide keyword suggestions to users that issue queries to a search engine. The keyword suggestions may be used to refine the queries that are submitted to the search engine or to anticipate subsequent queries.

Conventional short-term intent detection applications infer a user's intent based on their issued queries. The conventional short-term intent detection application analyzes the user's issued queries to infer the user's intent. Based on the inferred user's intent, the conventional short-term intent detection application predicts the next query that the user will issue during the current search session.

The current search session of the user includes queries that are proximate in time and related to a particular topic identified from the terms of the query. For instance, a user may access a search engine page and issue a query for a movie. The access to the search engine initiates the search session. The search session terminates when the user closes the webpage or changes topic. The user may change topic by idling for a period of time or by issuing a query for a new topic, i.e., finance, without using a linking term to connect to the previous queries of the previous topic, i.e., movie. The conventional short-term intent detection application executes during each search session and analyzes queries within the search session to suggest the subsequent query that the user will issue to the search engine. In turn, the search engine transmits the suggested query to the user.

SUMMARY

Embodiments of the invention include computer-readable media, computer systems, and computer-implemented methods for predicting future queries for a user based on aggregate queries from a community of users and a query history for users that are currently in search sessions with search engines.

The computing system includes search engines, query logs, and prediction components. The computing system selects a future query. The search engines receive queries from a user and provide results to the user. The query logs coupled to the search engines store queries issued by the user and other users of the search engine. In turn, the prediction components select future queries that the user is likely to issue in a certain time period based on a query history for the user and aggregated behaviors for a group of users having corresponding queries stored in the query logs.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
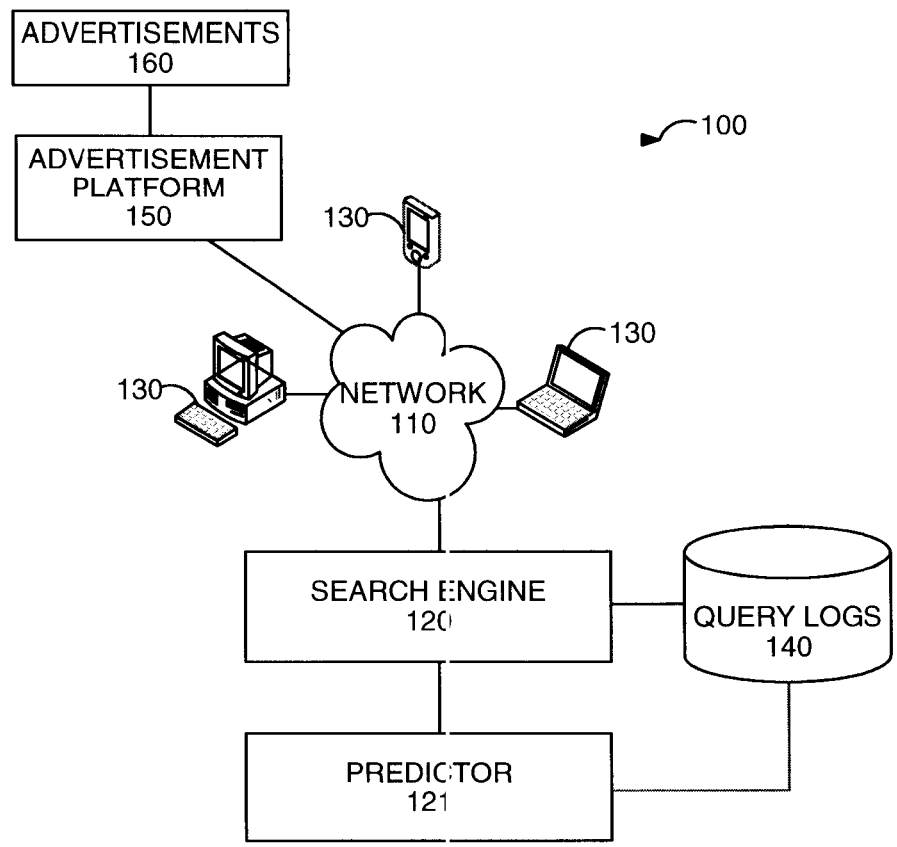
FIG. 1 illustrates an exemplary computing environment for selecting future queries, according to embodiments of the invention.

This patent describes the subject matter for patenting with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described. Further, embodiments are described in detail below with reference to the attached drawing figures, which are incorporated in their entirety by reference herein.

As utilized herein, the term "component" refers to any combination of hardware, software, or firmware.

A search engine configured with a predictor component generates future queries for a user based on user queries and aggregate queries. The predictor component generates language models from the query log. The language models include a background model and a lifetime model for the statistical usage of queries sent to the search engine. In certain embodiments, the future queries selected by the predictor component are used to select advertisements that are displayed to a user at an appropriate time.

A computer system for selecting future queries and generating advertisements includes client devices communicatively connected to a search engine and advertisement platform. The client devices generate user queries and transmit the user queries to the search engine. The search engine includes a predictor component that generates future queries for the user. The future queries are selected based on statistical probabilities of queries received from other users and the query history of the user that issues a query to the search engine.

As one skilled in the art will appreciate, the computer system includes hardware, software, or a combination of hardware and software. The hardware includes processors and memories configured to execute instructions stored in the memories. In one embodiment, the memories include computer-readable media that store a computer-program product having computer-useable instructions for a computer-implemented method. Computer-readable media include both volatile and nonvolatile media, removable and nonremovable media, and media readable by a database, a switch, and various other network devices. Network switches, routers, and related components are conventional in nature, as are means of communicating with the same. By way of example, and not limitation, computer-readable media comprise computer-storage media and communications media. Computer-storage media, or machine-readable media, include media implemented in any method or technology for storing information. Examples of stored information include computer-useable instructions, data structures, program modules, and other data representations. Computer-storage media include, but are not limited to, random access memory (RAM), read only memory (ROM), electrically erasable programmable read only memory (EEPROM), flash memory or other memory technology, compact-disc read only memory (CD-ROM), digital versatile discs (DVD), holographic media or other optical disc storage, magnetic cassettes, magnetic tape, magnetic disk storage, and other magnetic storage devices. These memory components can store data momentarily, temporarily, or permanently.

FIG. 1 illustrates an exemplary computing environment 100 for selecting future queries, according to embodiments of the invention. The computing environment 100 includes a network 110, a search engine 120, a predictor component 121, client devices 130, query logs 140, an advertisement platform 150, and advertisements 160.

The network 110 is configured to facilitate communication between the client devices 130 and the search engine 120. The network 110 may be a communication network, such as a wireless network, local area network, wired network, or the Internet. In an embodiment, the client devices 130 communicate user queries to the search engine 120 utilizing the network 110. In response, the search engine 120 communicates future queries related to the user queries, results of the user queries, and advertisements 160 corresponding to the future queries to the client devices 130.

The search engine 120 responds to user queries received from the client devices 130. The search engine 120 includes a predictor component 121 that generates future queries based on language models representing queries from other users and previous queries of the user that issued the query. The search engine is communicatively connected to query logs 140 that store the queries issued by users. In some embodiments, the search engine 120 returns advertisements related to the future queries to the user. Moreover, the search engine 120 may provide a listing of results that includes webpages or electronic documents that match the terms included in the user queries or the future queries generated by the predictor component 121.

The predictor component 121 generates language models from query logs to forecast a query that will be issued by a user within a specified period. The specified period may include a week, a bi-week, a month, a quarter, or a year. The predictor component 121 analyzes query logs 140 for a user and other users to the search engine to generate the language models, which include statistical models for the queries received by the search engine 120. In turn, the predictor component 121 returns future queries having a high probability—probability close to unity—of being subsequently issued within a corresponding time period by the user that issued the related queries to the search engine.

The client devices 130 are utilized by a user to generate user queries and receive query results, advertisements, or future queries. The client devices 130 include, without limitation, personal digital assistants, smart phones, laptops, personal computers, or any other suitable client computing device. The user queries generated by the client devices 130 may include terms that correspond to things that the user is seeking.

The query logs 140 store queries issued by the users of the client devices 130. The query logs 140 include the terms of the query, the time the query was issued, a pointer to results corresponding to the query, and user interaction behavior including dwell times and click-through rates. Moreover, the query logs may include transaction data for purchases made by the user. The query logs 140 may also include an identifier, such as a media access address or internet protocol address, for each client device and correspond the identifier for the client device to queries included in the query logs 140. In some embodiment, the user of the client device 130 may register a user name and password with the search engine 120 to have the queries issued by the user associated with a profile of the user. Accordingly, the query logs may also store identifiers for the users or the client devices 130. In an alternate embodiment, the identifier corresponding to the queries stored in the query logs 140 may be a cookie that is a combination of an identifier of a client device 130 and an identifier of the user.

The advertisement platform 150 generates advertisements 160 that are transmitted via network 110 to the client devices 130, which display the advertisements 160 to the user. In certain embodiments, the advertisement platform 150 receives a future query generated by the predictor component 121 and selects an advertisement 160 that corresponds to the future query. Additionally, in an embodiment, the predictor component 121 may specify a time period for displaying the advertisement 160 based on the time period that the user may issue the future query. In other words, the predictor component 121 may instruct the advertisement platform 150 to delay transmission of the advertisement 160 to the user until the specified timed period has expired. Once the time period has expired, the advertisement platform 150 may transmit the advertisement to the client device 130.

The advertisements 160 include banner advertisements, text, and image that describe a product, service or thing that an advertiser wishes to promote to users. The things described in the advertisements 160 may include events and items from all over the world, from various merchants, and from various distributors. The advertisements 160 are selected by the advertisement platform 150 and transmitted to the appropriate client device 130 at the appropriate time.

Accordingly, the computing environment 100 is configured with a search engine 120 that predicts what the user is going to be interested in and when the user's interest is going to occur. After the search engine 120 generates a prediction of the user's queries, an advertisement platform 150 generates advertisements 160 that should result in a successful transaction with the user.

One of ordinary skill in the art understands and appreciates the operating environment 100 has been simplified for description purposes and alternate operating environments are within the scope and spirit of this description.

In certain embodiments, a computer system is configured with a data collection component, query logs, and language models for generating a future query for a user issuing queries to a search engine. The language models are tuned by the computing environment using statistical probabilities of queries collection by the data collection component and stored in the query logs. The user submits the user query to the data collection component via the search field to obtain a listing of web pages or electronic documents that match the user query, the future query related to the submitted user query, or advertisements that correspond to the user query or a future query generated by the computing system.

Figure 2:
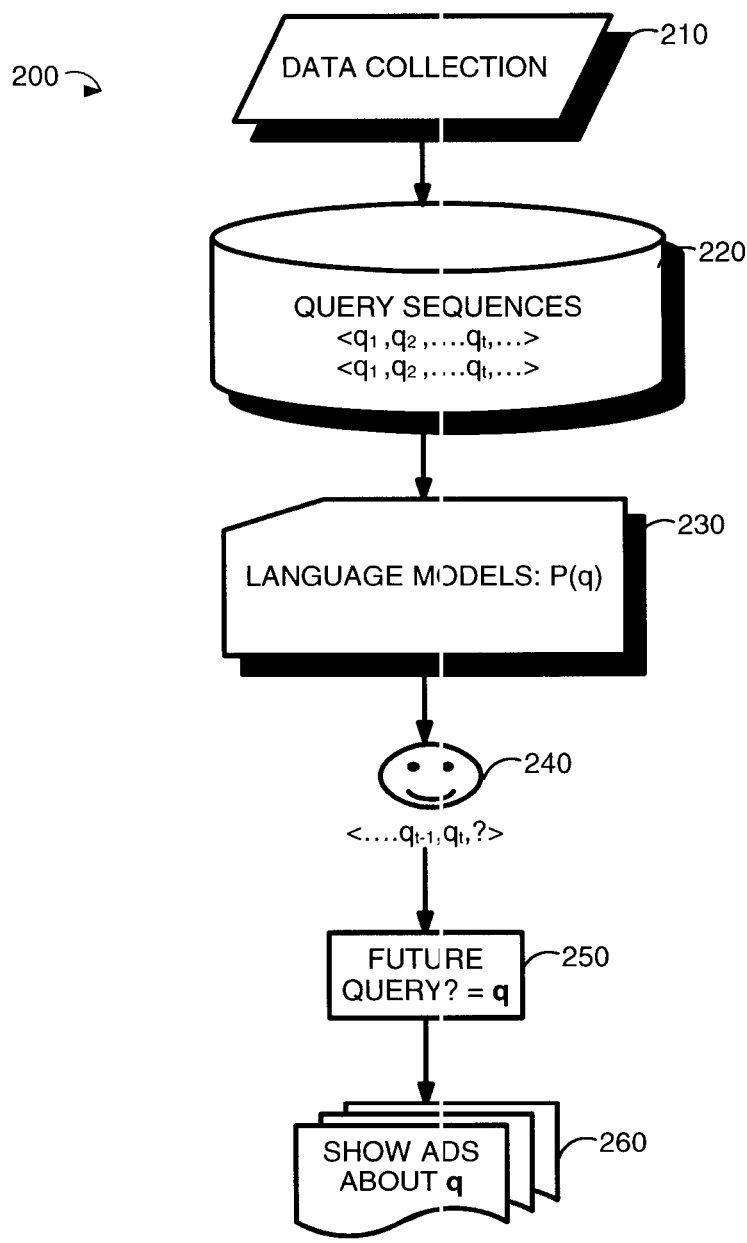
FIG. 2 illustrates an exemplary component diagram of a computer system for selecting advertisements that correspond to future queries, according to embodiments of the invention.

FIG. 2 illustrates an exemplary component diagram of a computer system 200 for selecting advertisements that correspond to future queries, according to embodiments of the invention. The computer system 200 includes a data collection component 210, a query log component 220, a language model component 230, a client 240, a future query selector 250, and an advertisement selector 260.

The data collection component 210 collects the queries issued by a user of the computing system 200. The queries are stored in a database or any other storage structure along with a day and time the query was issued and appropriate identifiers for the user that issued the query. The database storing the queries may be the query log component 220.

The query log component 220 stores the queries and sorts the queries received into partitions. The partitions may be identified based on time period. The query log component 220 may partition the queries based on weeks of a year. Thus, each query received by the data collection component 210 during the first week of a year is associated with a first-week partition. Further, each query received by the data collection component 210 during the second week of a year is associated with a second-week partition. In another embodiment, the partitions may include bi-weeks, months, quarters, or years. The partitioned queries represent query sequences received from users during the time period associated with partition. The partitioned queries are analyzed by the language model component 230 to detect patterns across varying time periods and to generate the language models for predicting future queries. In some embodiments, the query log component 220 stores a query history associated with an identifier for a user that issues queries to a search engine.

The language model component 230 is used to predict a future query for a user from the user's query history and aggregate user histories stored in by the query log component 220. The language model component 230 uses statistical calculations to tune the language model and to generate the future query. In the language model, P(q) is the probability of issuing a query at a specified time. $P(q)=\alpha P_F(q)+(1-\alpha)P_B(q)$. $P_B(q)$ is the background model, $P_F(q)$ is the lifetime model, and $\alpha$ is a tuning variable that is altered during a learning stage for generation of the background model and the lifetime model.

The background model represents a probability that is assigned to the query based on aggregate queries from other users that are stored in the query log. The background model may be used to select a popular query or a randomly selected query as the future query when the lifetime model is not available, $P_F(q)=0$, because the computer system 200 does not have data or query patterns collected from the user that issued the query. When the lifetime model is unavailable, the computer system uses the background model to predict the query. For instance, during a year users of the computing system 200 may submit queries for housing 1,000 times and queries for furniture may be submitted 100 times. These queries are stored by the query log component 220. In turn, the language model component 230 processes the queries and the background model determines that the probability of any user issuing a query for housing is 0.909 as opposed to 0.0909, which is the probability of a user issuing a query for furniture. The language model component 230 determines that the query for housing is ten times more likely to be submitted as a query by the current user of the computing system 200 than a query for furniture. The language model component 230 may make this determination without referencing the lifetime model for the user because the lifetime model for the user is unavailable. Accordingly, the background model determines which queries stored in the query log component are more likely to be submitted by the user without considering the user's query history. Instead, the background model looks at the query histories stored in the query log component 220 for all other users of the computing system 200.

The language model component 230 generates the lifetime model by traversing the query history of the user that issued the query. The language model component 230 partitions the query history of the user into different time periods. Each partition, $Q_t$, includes a set of queries that occur at a time prior to the future query. In some embodiment, the language model component 230 may partition the user's query history by a timestamp, date and time, associated with each query. The timestamp may reflect the time the query is issued by the user or the time the data collection component 210 receives the query. The queries in each partition may impact the future query. Accordingly, the language model component 230 generates the lifetime model by $$P_F(q) = \frac{1}{T} \sum_{t=1-T} P(q \mid Q_t),$$

which sums partial probabilities within each partition across all time periods of the user's query history.

The language model component 230 calculates the partial probabilities $P(q|Q_t)$ with each partition by $$P(q \mid Q_t) = \frac{1}{|Q_t|} \sum_{q_k \in Q_t} P(q \mid q_k, t).$$

For each query in the partition issued proximate to time period, t, which corresponds to the partition time period, the language model component 230 determines the probability that the future query, q, is related to current query, $q_k$, included in the partition, $Q_t$. The language model component 230 calculates the probability of relatedness between the future query and the current query using hidden categories of relationships, $C_j$, to define the relationship between the future query and the current query by evaluating $P(q|q_k,t)=\Sigma_{C_j} P(q|C_j,t)P(C_j|q_k)$.

The hidden categories of relationship, $C_j$, may be altered during the learning stage of the generation of the background model and lifetime models to maximize the observed probabilities associated with queries received from other users. During the learning stage, the language model component 230 attempts to maximize $P(Q)=\Pi_q P(q)$ for the observed queries included in the query log component 220 by tuning $C_j$, $P(q|C_j,t)$, $P(C_j|q_k)$, and $\alpha$.

The client 240 issues queries to the computing system 200 at various times. The client 240 receives a future query from a future query selector 250. The future query selector 250 applies the background models and lifetime models to select a future query for the user. In an embodiment of the invention, the future query selector 250 transmits the future query to the client 240 or to an advertisement selector 260.

The advertisement selector 260 receives the future query and selects the appropriate advertisement. In some embodiments, the future query selector informs the advertisement selector of a time period for transmitting an advertisement to the client 240. Accordingly, the computer system 200 may predict what queries a user is going to issue now, three months from now, or any specified time period from now, based on the user's query history and the aggregated queries of all other users of the computer system.

The language models generated by the computing system may be used by a prediction component or future query selector to identify a time period of a future query and terms for the future query. In an embodiment, the language models may be represented by a graph illustrating a user query history across all time periods included in the query logs and corresponding category clusters defined by the computing system using aggregate queries from other users included in the query log. The graph may be used to select the query having the highest probability.

Figure 3:
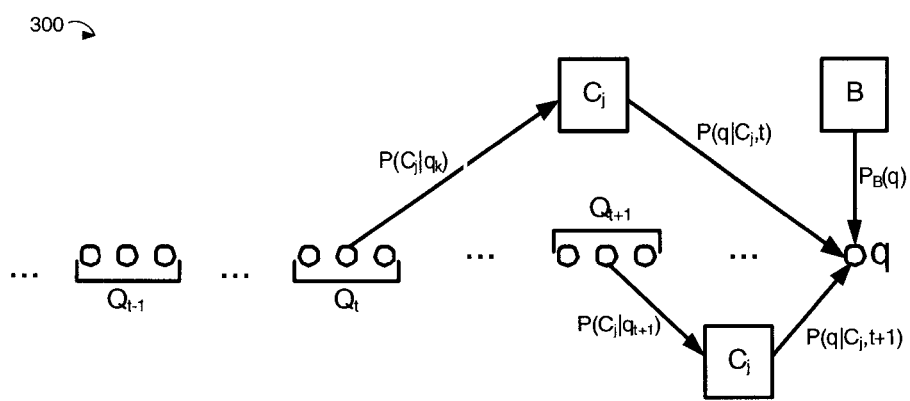
FIG. 3 illustrates an exemplary graph for language models generated from query logs, according to embodiments of the invention.

FIG. 3 illustrates an exemplary graph 300 for language models generated from query logs, according to embodiments of the invention. The graph 300 includes partitions, $Q_t$, that include queries, $q_k$, issued proximate to time period t. For each query, $q_k$, the graph includes a link to a cluster, $C_j$, that specifies the probability, $P(C_j|q_k)$, that the query belongs to the cluster. Generally, a query with similar semantic meaning or high affinity to a category associated with a cluster is assigned a high probability by the computing system. For example, the category vehicle may include links to queries for cars, autos, automobiles, sport utility vehicles (SUV), Toyota™, and Honda™. These terms may be assigned high probabilities for the category vehicle because of the similar meaning among the terms or the high affinity for the terms. Thus, the related terms do not necessarily need the same meaning as the term corresponding to the category for the cluster. The computing system assigns the probability of relatedness based on the queries included in the query logs. In an embodiment, the probability of relatedness is estimated from aggregated queries issued by other users. Once the probability of the current query being related to the cluster is defined by the computing system, the computing system estimates the probability that the future query is related to the category corresponding to the cluster after a specified time period $P(q|C_j,t)$. The computing system determines a probability that the future query is related to the cluster after a specified time period is observed by analyzing the aggregated queries stored in the query logs.

The graph 300 includes a background model node that represents the probability that the future query is a popular query that was issued by the other users. The computing system estimates $P_B(q)$ by analyzing the aggregated queries included in the query logs. Based on the identified clusters, $C_j$, the computing system may estimate the probability for the future query, q, using the graph 300 that includes $P(C_j|q_k)$, $P(q|C_j,t)$, $P_B(q)$. Accordingly, the computing system may efficiently compute $P(q)=\alpha P_F(q)+(1-\alpha)P_B(q)$.

In some embodiments, the computing system uses the aggregated queries for other users stored in the query logs to tune the language models. The language models are tuned by adjusting parameters $C_j$, $P(q|C_j,t)$, $P(C_j|q_k)$, and $\alpha$ until the probability determinations become constant. During the learning stage, the parameters are initialized to random values. The computing system uses the random values to estimate the probabilities. The estimated probabilities are compared to the probabilities observed from the aggregated query logs by the computing system. The parameters are tuned by the computing system to allow the estimated probabilities to converge to the observed probabilities. Accordingly, the learning stage tunes the language models.

In embodiments of the invention, the language models represent statistical models that are used to forecast user queries. The computing system executes computer-implemented methods to receive a user query and apply the language models on the received user query. In turn, the computing system generates a future query for the user and specifies a time period to deliver the future query. Thus, when the time period expires the computing system may provide the future query to the user or an advertisement corresponding to the future query.

Figure 4:
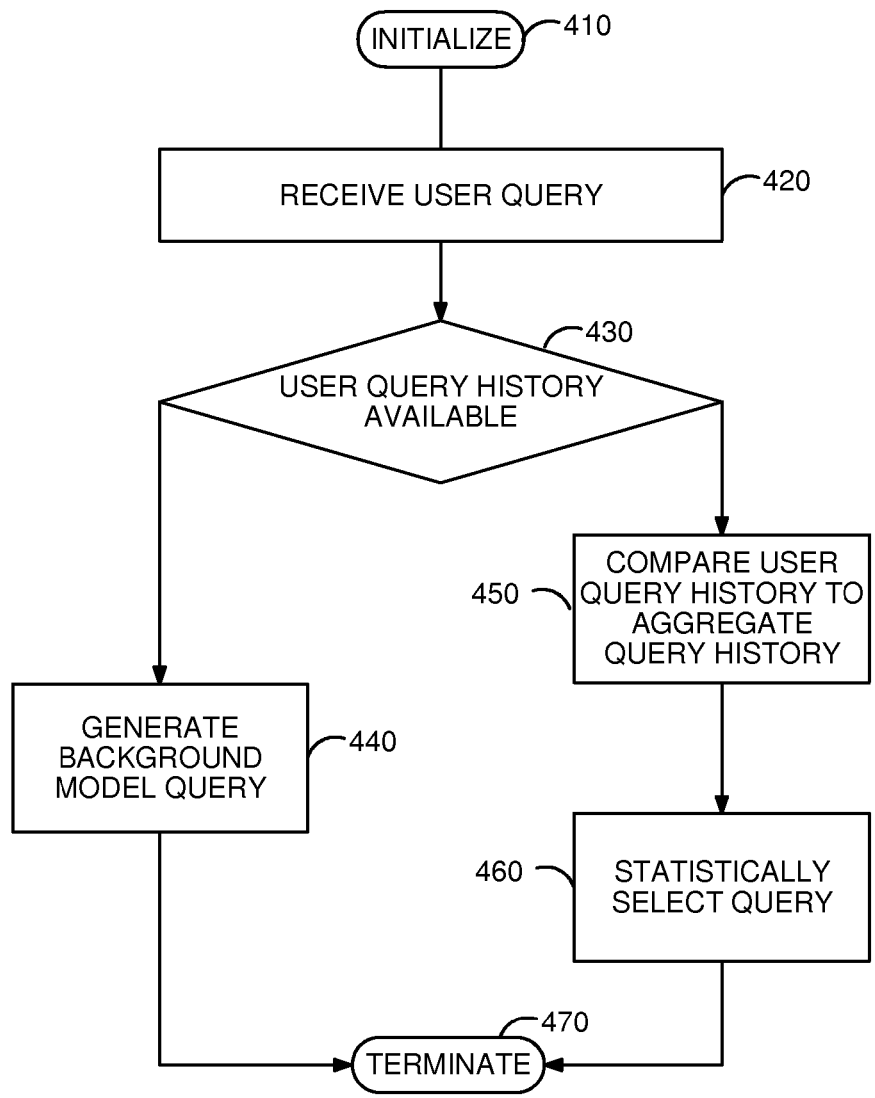
FIG. 4 illustrates an exemplary method to select a future query, according to embodiments of the invention.

FIG. 4 illustrates an exemplary method to select a future query, according to embodiments of the invention. The method initializes in step 410. In step 420, the computing system receives a query from a user of the computing system. In step 430, the computer system determines whether a user query history is available for the user. When a query history of the user is unavailable, the computer system generates a background model query as the future query for the user in step 440. In some embodiments, the background model query is randomly selected from the query log or a query identified to be frequently used in the aggregated queries for a community of users. However, when a query history of the user is available, the computer system compares the query history of the user to an aggregate query history for other users, in step 450. In turn, the computing system statistically selects a future query, in step 460. The method terminates in step 470.

In an alternate embodiment, the computing system uses language models to determine a probability for a future query. The computing system partitions the user query history and aggregated queries from other users. In turn, clusters are identified and used to calculate relatedness probabilities of a current query to a cluster and relatedness probabilities of a future query to a cluster. The computing system uses the relatedness probabilities and a background model probability to estimate the probability of the future query.

Figure 5:
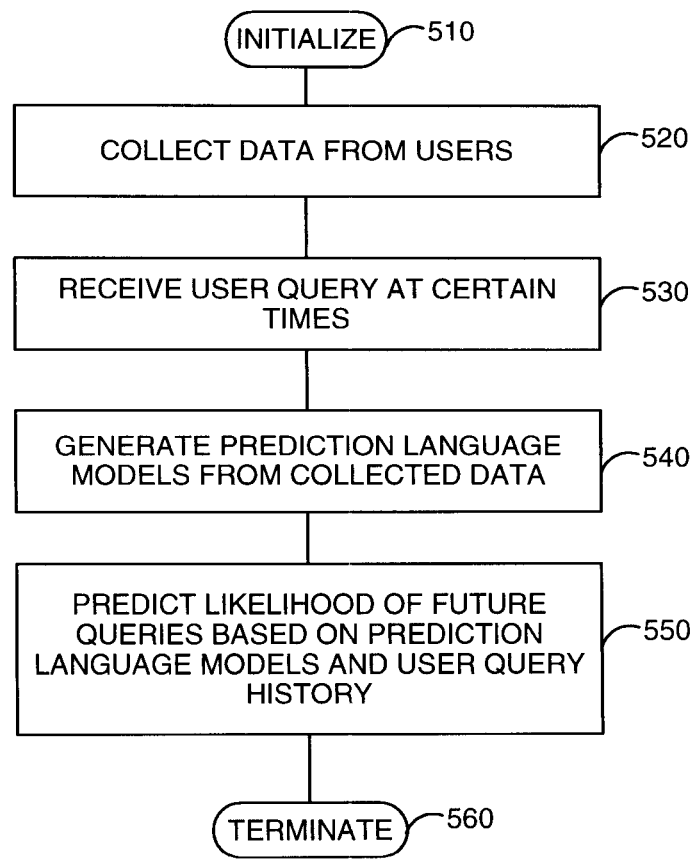
FIG. 5 illustrates an exemplary method to determine a likelihood for a future query, according to embodiments of the invention.

FIG. 5 illustrates an exemplary method to determine a likelihood for a future query, according to embodiments of the invention. The method initializes in step 510. In step 520, the computing system collects data from searches issued by users. The computing system receives a user query at a certain time, in step 530. In turn, the computing system generates prediction language models from the collected data, in step 540. In step 550, the computing system predicts a likelihood of a future query based on the language models and a query history of the user. In step 560, the method terminates.

In summary, media, method, and computing systems collect data from user queries and store the collected data in query logs. The query logs are analyzed by the computing systems to identify patterns and probabilities associated with the identified patterns to generate language models that predict future queries for a user. The computing systems employ a learning stage to tune the language models based on observed probabilities in the query logs for a community of users. The computing system uses the future queries to suggest terms for subsequent queries to a user at a predefined time period or to select appropriate advertisements for the user at the predefined time period.

For instance, when the computing system receives frequent queries for homes, the computing system may predict that the user may develop an interest in furniture in the coming weeks. Similarly, when the computing system receives frequent queries for cars and the queries indicate that the user recently purchased a car, the computing system may predict that the user may be interested in car insurance every six months or every year or that the user may be interested in car maintenance after a warranty period expires. Thus, the computing system is configured to suggest future queries at a time that the user is most likely going to issue queries for the thing predicted by the computer system or present advertisements related to the future queries at the time the user is most likely going to issue queries for the thing predicted by the computer system.

The foregoing descriptions of the embodiments of the invention are illustrative, and modifications in configuration and implementation will occur to persons skilled in the art. For instance, while the embodiments of the invention have generally been described with relation to FIGS. 1-5, those descriptions are exemplary. Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims. The scope of the embodiments of the invention are accordingly intended to be limited only by the following claims.

The technology claimed is:

1. A computing system configured to identify a predicted future query, the system comprising:
   one or more query logs configured to store queries issued by users in several partitions; and
   one or more prediction components configured to identify predicted future queries that a user is likely to issue in a certain time period based on a query history for the user and aggregated behaviors for a group of users corresponding to the queries stored in the query log for the group of users.

2. The computing system of claim 1, further comprising one or more advertising platforms configured to use the predicted future queries to select proper advertisements as a function of time.

3. The computing system of claim 2, wherein the selected advertisement is displayed after a predicted period of time associated with the predicted future queries expires.

4. The computing system of claim 2, wherein the selected advertisement is displayed to the user after a predicted period of time has expired since the predicted future queries were identified.

5. The computing system of claim 4, wherein the predicted period of time is one of a quarter year, a month, a bi-week, or a week.

6. The computing system of claim 1, wherein the predicted future queries are associated with recurring events.

7. One or more computer readable storage media storing instructions for performing a method of generating a future query for a user, the method comprising:
   locating user queries and aggregate queries in a query log;
   generating a language model based on the query log; and
   selecting a future query based on the language model for the user.

8. The storage media of claim 7, wherein the selected future query is based on previous activities of the user observed through previously received user queries and common behaviors of other users represented in query log.

9. The storage media of claim 7, wherein the language model includes a background model and lifetime model.

10. The storage media of claim 7, wherein the language model represents a statistical usage for queries received by the search engine.

11. The storage media of claim 7, wherein the selected future query is associated with a predicted time period.

12. The storage media of claim 11, wherein the predicted time period is one of: immediately, 24 hours, one month, three month, or one quarter.

13. The storage media of claim 7, wherein the selected future query is configured for display to the user with an advertisement that relates the selected future query.

14. A computer-implemented method of selecting a future query, the method comprising:
   locating user queries and aggregate queries in a query log;
   generating a language model based on the query log; and
   selecting a future query based on the language model for the user.

15. The method of claim 14, wherein the selected future query is based on previous activities of the user observed through previously received user queries and common behaviors of other users represented in query log.

16. The method of claim 14, wherein the language model includes a background model and lifetime model.

17. The method of claim 14, wherein the language model represents a statistical usage for queries received by the search engine.

18. The method of claim 14, wherein the selected future query is associated with a probability identified in the language model.

19. The method of claim 18, wherein the selected future query is associated with a predicted time period.

20. The method of claim 14, wherein the selected future query is configured for display to the user with an advertisement that relates the selected future query.

* * * * *